United States Patent
Teyeb et al.

(10) Patent No.: US 9,485,693 B2
(45) Date of Patent: Nov. 1, 2016

(54) ADAPTING A TRIGGERING THRESHOLD FOR CELL RE-SELECTION MEASUREMENTS

(75) Inventors: Oumer Teyeb, Solna (SE); Konstantinos Dimou, San Francisco, CA (US); Walter Müller, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 266 days.

(21) Appl. No.: 14/240,417

(22) PCT Filed: Aug. 22, 2012

(86) PCT No.: PCT/SE2012/050891
§ 371 (c)(1),
(2), (4) Date: Feb. 24, 2014

(87) PCT Pub. No.: WO2013/028128
PCT Pub. Date: Feb. 28, 2013

(65) Prior Publication Data
US 2014/0213259 A1    Jul. 31, 2014

Related U.S. Application Data

(60) Provisional application No. 61/527,381, filed on Aug. 25, 2011.

(51) Int. Cl.
*H04W 36/00* (2009.01)
*H04W 48/16* (2009.01)

(52) U.S. Cl.
CPC ......... *H04W 36/0094* (2013.01); *H04W 48/16* (2013.01)

(58) Field of Classification Search
CPC .......... H04W 36/0083; H04W 36/04; H04W 36/16; H04W 36/18; H04W 36/20; H04W 36/22
USPC ............... 455/436, 440, 67.11, 67.13, 226.1, 455/226.2; 370/331, 332
See application file for complete search history.

(56) References Cited

U.S. PATENT DOCUMENTS

| | | | | |
|---|---|---|---|---|
| 8,576,801 | B2* | 11/2013 | Turk | H04W 36/32 370/331 |
| 8,594,699 | B1* | 11/2013 | Mach | H04W 36/32 455/456.1 |

(Continued)

FOREIGN PATENT DOCUMENTS

| | | |
|---|---|---|
| WO | 2009043002 A2 | 4/2009 |
| WO | 2011041753 A2 | 4/2011 |
| WO | 2011085204 A1 | 7/2011 |

OTHER PUBLICATIONS

ZTE, "Discussion of s-measure for CSG cell", TSG RAN WG2#67bis, Miyazaki, JP, Oct. 12, 2009, pp. 1-2, R2-095675, 3GPP.

(Continued)

*Primary Examiner* — Temica M Beamer
(74) *Attorney, Agent, or Firm* — Coats & Bennett, P.L.L.C.

(57) ABSTRACT

A base station (12) and a method therein for adapting a triggering threshold for cell re-selection measurements performed by a mobile terminal (20) served by a macro cell (14). The macro cell (14) is supported by the base station (12), and the base station (12) and the mobile terminal (20) are comprised in a wireless communications network (10). The base station determines a serving cell signal strength threshold to be used for triggering cell re-selection measurements by the mobile terminal (20) in dependence on the availability of small cells (18a,18b) within or neighboring the macro cell (14). The base station (12) further transmits the determined serving cell signal strength threshold to the mobile terminal (20).

26 Claims, 5 Drawing Sheets

(56) References Cited

U.S. PATENT DOCUMENTS

| | | | |
|---|---|---|---|
| 8,682,331 B2* | 3/2014 | Nagaraja | H04W 36/30 370/328 |
| 2012/0106370 A1* | 5/2012 | Radulescu | H04W 36/0083 370/252 |

OTHER PUBLICATIONS

Ericsson, et al., "Carrier Aggregation and the s-Measure criterion", 3GPP TSG-RAN WG2#69, Feb. 22, 2010, pp. 1-4, Tdoc R2-101200, 3GPP.

Potevio, "Small cell discovery in HetNet", 3GPP TSG RAN WG2#75, Aug. 22, 2011, pp. 1-2, R2-114142, 3GPP.

Alcatel-Lucent, et al., "On Network-Assisted Pico Cell Discovery in LTE HetNets", 3GPP TSG RAN WG2 Meeting #75, Athens, Greece, Aug. 22, 2011, pp. 1-4, R2-114362, 3GPP.

3rd Generation Partnership Project. "Technical Specification Group Radio Access Network; Evolved Universal Terrestrial Radio Access (E-UTRA); Radio Resource Control (RCC); Protocol specification (Release 9)." Jun. 2011; pp. 1/253; 3GPP TS 36.331 V9.7.0; Sophia Antipolis, France.

* cited by examiner

ADAPTING A TRIGGERING THRESHOLD FOR CELL RE-SELECTION MEASUREMENTS

TECHNICAL FIELD

Embodiments herein relate to a base station, a mobile terminal and methods therein. In particular, embodiments herein relate to adaptation of a triggering threshold for cell re-selection measurements performed by the mobile terminal.

BACKGROUND

There have been several proposals to meet the ever increasing traffic demands and high quality expectations from end users for mobile broadband services. The upgrading of existing base stations to use higher data rate technologies such as High Speed Packet Access (HSPA) or Long Term Evolution (LTE), or to use other optimizations such as Multiple Input Multiple Output (MIMO), antenna tilting, etc., is one of the most widely adopted measure used to meet these demands. This may be further enhanced by a straightforward increasing of the number of base stations (e.g. E-UTRAN NodeBs or "eNBs") in a network, which is known as "macro densification." However, these methods of improving the data rate may provide system gains only to a certain extent, and they may end up being very expensive.

As such, the concept of heterogeneous networks, where an existing homogeneous network is overlaid with additional lower-power, low-complexity base stations, is currently being researched as a solution to mitigate the cost and/or capacity limitations of macro densification or upgrading.

The homogeneous layer of macro cells is known as a "macro" layer, as the eNBs in this layer have large coverage areas. The non-homogenous layer contains low-power nodes such as picocells and femtocells. Picocells ("picos") include low-power eNBs and are generally suitable for indoor or outdoor usage. Femtocells ("femtos") include home base stations ("HeNBs") and are generally suitable for indoor home usage. A femto that is open only to few users, e.g., within a household, a shop, etc., is referred to as a Closed Subscriber Group ("CSG") by the 3rd Generation Partnership Project (3GPP). Throughout this application, the term "small cell" is used to refer to a cell supported by a low-powered base station such as a picocell or a femtocell. Also, throughout this application any reference to an eNB is understood to refer to a macro eNB supporting a macro cell, unless the eNB is specifically referred to as a low-powered eNB supporting a small cell.

Heterogeneous networks are expected to offer a low cost alternative to macro densification and are expected to be effective, as the deployment of the low-power nodes may be made more focused towards hot spots and areas with coverage problems.

Handover is an important aspect of mobile communication systems, wherein the system tries to assure service continuity of a mobile terminal, e.g. a User Equipment or "UE", by transferring the connection from one cell to another depending on several factors such as signal strength, load conditions, service requirements, etc. The provision of efficient/effective handovers, e.g. minimum number of unnecessary handovers, minimum number of handover failures, minimum handover delay, etc., affects not only the Quality of Service (QoS) of the end user but also the overall mobile network capacity and performance.

Currently, "s-measure", sometimes also referred to as "s-Measure", is used to configure when the UE starts measuring the power of neighbor cells. The s-measure is defined as a Reference Signal Received Power (RSRP) value. Once a UE's measurement of the RSRP of its serving cell drops below the s-measure threshold, the UE begins measuring the RSRP of neighboring cells, and the measured neighboring cells may ultimately be used for cell re-selection through handover. In homogenous networks, this works quite well because cells are usually deployed in such a way that they have a small shared coverage area around their cell edges. When a UE is very close to the eNB, the RSRP is typically higher than the s-measure, and when the UE moves towards the cell edge, the RSRP decreases, and at some point it falls below the s-measure and the UE starts measuring the Reference Signal (RS) from neighboring cells. Thus, the UE starts measuring RS from other cells only when it is necessary to do so.

In heterogeneous networks, on the other hand, the straightforward usage of the s-measure may cause problems, because small cells may be located close to the macro eNB (e.g. for capacity boosting in hotspots) and as such the RSRP of the serving cell may be strong enough to not fall below the s-measure threshold near the coverage area of the small cell, causing the UE not to measure the signal power of otherwise available small cells within its macro serving cell.

SUMMARY

An object of embodiments herein is to provide a way of improving the performance in a communications network.

According to a first aspect of embodiments herein, the object is achieved by a method in a base station for adapting a triggering threshold for cell re-selection measurements performed by a mobile terminal served by a macro cell. The macro cell is supported by the base station, and the base station and the mobile terminal are comprised in a wireless communications network.

The base station determines a serving cell signal strength threshold to be used for triggering cell re-selection measurements by the mobile terminal in dependence on the availability of small cells within or neighboring the macro cell.

Further, the base station transmits the determined serving cell signal strength threshold to the mobile terminal.

According to a second aspect of embodiments herein, the object is achieved by a base station for adapting a triggering threshold for cell re-selection measurements performed by a mobile terminal served by a macro cell. The macro cell is supported by the base station, and the base station and the mobile terminal are comprised in a wireless communications network.

The base station comprises a determining circuit configured to determine a serving cell signal strength threshold to be used for triggering cell re-selection measurements by the mobile terminal. The determining circuit is configured to determine the serving cell signal strength threshold in dependence on the availability of small cells within or neighboring the macro cell.

Further, the base station comprises a transmitting circuit configured to transmit the determined serving cell signal strength threshold to the mobile terminal.

According to a third aspect of embodiments herein, the object is achieved by a method in a mobile terminal for performing cell re-selection measurements in dependence of a triggering threshold. The mobile terminal is served by a macro cell, which macro cell is supported by a base station.

The base station and the mobile terminal are comprised in a wireless communications network.

The mobile terminal receives a serving cell signal strength threshold from the base station. The mobile terminal receives the serving cell signal strength threshold by receiving from the base station a plurality of thresholds each mapped to one or more associated positions within the macro cell and selecting one threshold of the plurality of thresholds based on its position within the macro cell.

Further, the mobile terminal measures serving cell signal strength and neighboring cell signal strength in dependence of the received serving cell signal strength threshold.

Furthermore, the mobile terminal transmits a measurement report to the base station when the neighboring cell signal strength is better than an offset relative the serving cell signal strength.

According to a fourth aspect of embodiments herein, the object is achieved by a mobile terminal for performing cell re-selection measurements in dependence of a triggering threshold. The mobile terminal is served by a macro cell, which macro cell is supported by a base station. The base station and the mobile terminal are comprised in a wireless communications network.

The mobile terminal comprises a receiving circuit configured to receive a serving cell signal strength from the base station. The receiving circuit is further configured to receive from the base station a plurality of thresholds each mapped to one or more associated positions within the macro cell and to select one threshold of the plurality of thresholds based on its position within the macro cell.

Further, the mobile terminal comprises a measuring circuit configured to measure serving cell signal strength and neighboring cell signal strength in dependence of the received serving cell signal strength threshold.

Furthermore, the mobile terminal comprises a transmitting circuit configured to transmit a measurement report to the base station when a neighboring cell signal strength is better than an offset relative the serving cell signal strength.

Since the serving cell signal strength threshold to be used for triggering cell re-selection measurements by the mobile terminal is determined in dependence on the availability of small cells within or neighboring the macro cell, the mobile terminal will perform cell re-selection measurements at appropriate times independent of whether or not the mobile terminal is located close to the center of its serving cell or near the cell edges. Thereby, unnecessary outages and/or radio link failure is prevented. This results in an improved performance in the communications network.

An advantage of embodiments herein is that a flexible system is provided with may be realized either via an Operation and Maintenance (OAM) network node or through peer to peer communication between neighboring nodes. Thus, the system is viable for both coordinated and uncoordinated deployments, respectively.

A further advantage of embodiments herein is that they are transparent to the mobile, and thus that older mobile terminals may benefit from those embodiments.

According to one non-limiting embodiment, a method at a base station adapts a triggering threshold for cell re-selection measurements by a mobile terminal in a wireless communication network. The method includes determining a serving cell signal strength threshold to be used for triggering cell re-selection measurements by a mobile terminal served by the macro cell, in dependence on the availability of small cells within or neighboring the macro cell. The method also includes transmitting the determined threshold to the mobile terminal.

In at least one embodiment, a base station dynamically determines the triggering threshold based on the number of small cells that are available as potential handover candidates with respect to a particular mobile terminal, or with respect to mobile terminals operating within particular areas of a macro cell supported by the base station. In this embodiment, the triggering threshold corresponds to a signal strength value of the macro cell below which the mobile terminal will begin measuring signal strengths of neighboring cells.

The "determining" of the threshold in one embodiment includes dynamically determining a percentage or a quantity of available small cells that are within or are in the neighborhood of the macro cell. The "availability" of small cells may refer to small cells that are both active and within or proximate to the macro cell of the base station, for example. The "availability" may further denote those small cells that are actually active and in or around the current location of the mobile terminal.

The "determining" of the threshold may also include receiving an explicit indication regarding the presence of small cells from one or more other nodes in or associated with the wireless communication network. The "indication" may be received from one or more neighboring base stations, e.g. through a base station interface, from a network node within a core network of the wireless communication network, or both, for example.

The "determining" of the threshold may also include adapting or adjusting a nominal default threshold, otherwise used throughout by other mobile terminals in the macro cell, to produce the determined threshold. The "determining" of the threshold may be further dependent on the following items, either alone or in combination: locations of the small cells within or neighboring the macro cell; the location of the mobile terminal within the macro cell in relation to the locations of the small cells; and an indication that the mobile terminal is approaching a small cell within or neighboring the macro cell.

In one or more embodiments, the transmission of the determined threshold to the mobile terminal includes transmitting a plurality of determined thresholds each mapped to one or more associated positions within the macro cell, to enable the mobile terminal to select its own threshold based on its position within the macro cell.

In a corresponding apparatus embodiment, a base station operative to adapt a triggering threshold for cell re-selection measurements by a mobile terminal in a wireless communication network includes at least one communication interface for communicating with the mobile terminal in the wireless communication network, and one or more processing circuits operatively associated with the at least one communication interface. The one or more processing circuits are configured to determine a serving cell signal strength threshold to be used for triggering cell re-selection measurements by a mobile terminal served by the macro cell, in dependence on the availability of small cells within or neighboring the macro cell. The one or more processing circuits are further configured to transmit, via the communication interface, the determined threshold to the mobile terminal.

The described method embodiments and the described apparatus focus on optimizing the setting of a triggering threshold, e.g. s-measure, in heterogeneous networks. In one or more embodiments, this is achieved by using an adaptive s-measure RSRP value that depends on the number of small cells in the neighborhood of the serving cell. When the number of the small cells that may be possible handover candidates to the serving cell is high, the s-measure value is scaled to reflect this. The serving cells may gather information regarding their small cell neighbors either by their own or information from an Operation and Maintenance (OAM) network node, for example. Additional information on the existence of small cells may be provided by users connected to macro cells, e.g. in the form of "proximity indication" and measurement reports, indicating the existence of CSG cells in the area.

BRIEF DESCRIPTION OF THE DRAWINGS

Examples of embodiments herein are described in more detail with reference to attached drawings in which.

Of course, embodiments herein are not limited to the above features and advantages. Indeed, those skilled in the art will recognize additional features and advantages upon reading the following detailed description, and upon viewing the accompanying drawings.

DETAILED DESCRIPTION

As part of developing embodiments herein, a problem will first be identified and discussed.

Figure 1:
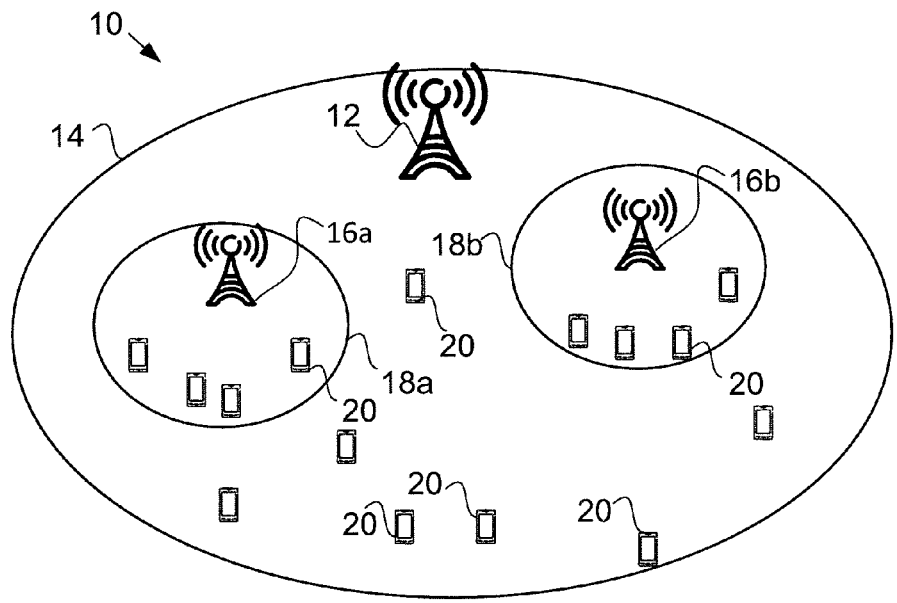
FIG. 1 is a block diagram of an example heterogeneous network.

FIG. 1 illustrates an example heterogeneous network 10 that comprises a base station 12 supporting an associated macro cell 14 coverage area. Within the macro cell 14 are two low-powered base station devices 16a-b, e.g., femtocells or picocells, each supporting associated small cells 18a-b that are at least partially within the macro cell 14. A plurality of mobile terminals 20 are located within the macro cell 14, and are supported by either the base station 12 or the devices 16. Although the base station 12 is described as an eNB, and the mobile terminals 20 are described as user equipment (UE), it is understood that these are only non-limiting examples and it is understood that other base stations and mobile terminals could be used. For example, the mobile terminals 20 could correspond to cellular telephones, smartphones, PDAs, or laptop computers.

As will be described below in greater detail, the base station 12 may adapt a triggering threshold, e.g. s-measure, for cell re-selection measurements by the mobile terminals 20 in the wireless communication network 10. When used herein, the expression "cell re-selection" is to be understood as cell change through handover, i.e. cell change when performing handover. Further, the expression "cell re-selection measurements" is to be understood as comprising measurements for cell re-selection in IDLE mode and measurements in handover during CONNECTED mode. The cell re-selection measurements may be used by the base station 12 to perform a handover to transfer a session with one of the mobile terminals 20 to one of the small cells 18.

In wireless communication networks, such as LTE networks, UE-assisted, network controlled handover is utilized, see, e.g., Technical Specification 36.300 from the 3GPP. As part of this process, the network configures the UE to perform measurements and send measurement reports when certain criteria are met. Based on these reports the UE is moved, if required and possible, to the most appropriate cell that will provide service continuity and quality. This relates to Actions 106, 108 and 806 to be described below. A UE measurement report configuration comprises the reporting criteria e.g. whether it is periodic or event triggered, as well as the measurement information that the UE has to report.

In LTE networks, two notable measurement metrics are the Reference Signal Received Power (RSRP) and Reference Signal Received Quality (RSRQ). RSRP is a cell-specific measure of signal strength and it is mainly used for ranking different cells for handover and cell reselection purposes, and it is calculated as the linear average of the power of the Resource Elements (REs) which carry cell-specific Reference Symbols (RSs). The RSRQ, on the other hand, also takes the interference into consideration by taking the total received wideband power into account as well.

One of the configuration parameters that UEs receive from their eNB is the parameter "s-measure," which tells the UE when to start measuring neighboring cells. If the measured RSRP of the serving cell, e.g. macro cell 14, falls below the s-measure, indicating that the signal of the UE's serving cell is not that strong anymore, the UE starts measuring the signal strength of RSs from the neighboring cells.

While the s-measure determines when the UE starts measuring other cells, there are several other measurement configuration parameters that specify the triggering of handover measurement reports from the UE. The following event-triggered criteria are specified for intra-RAT (Radio Access Technology) measurement reporting in LTE and are discussed in greater detail in the "Radio Resource Control (RRC) Protocol" TS 36.331 specification from the 3GPP:

Event A1: Serving cell, e.g. macro cell 14, becomes better than absolute threshold (e.g. RSRP of serving cell exceeds the absolute threshold).

Event A2: Serving cell becomes worse than absolute threshold (e.g. RSRP of serving cell falls below the absolute threshold).

Event A3: Neighbor cell, e.g. cell 15 or 18, becomes better than an offset relative to the serving cell 14.

Event A4: Neighbor cell becomes better than absolute threshold.

Event A5: Serving cell becomes worse than one absolute threshold and neighbor cell becomes better than another absolute threshold.

Figure 2:
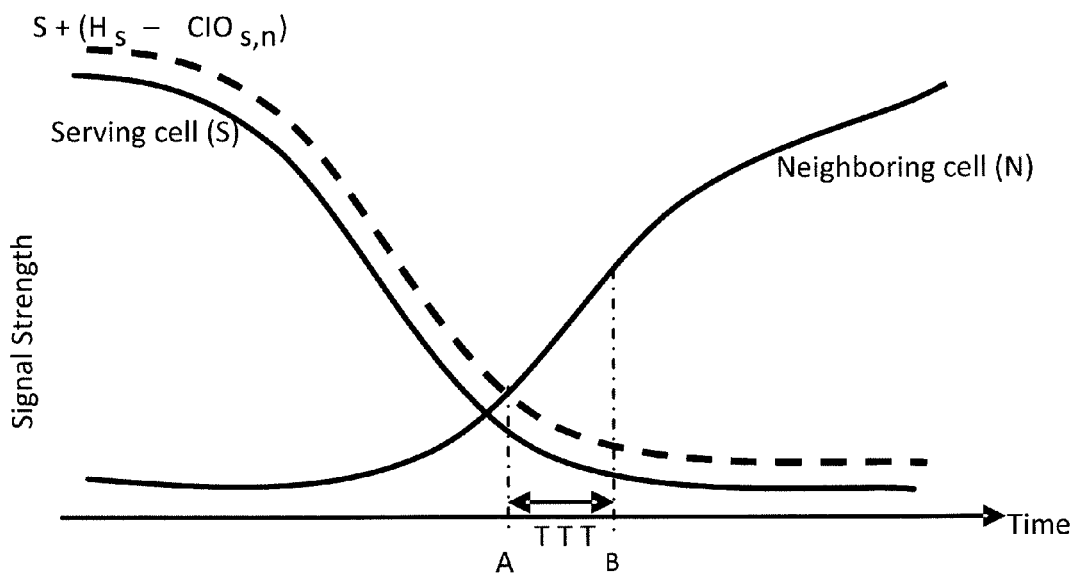
FIG. 2 is a signal strength diagram illustrating a handover event.

The most common measurement report triggering event related to handover is A3, and its usage is illustrated in FIG. 2. The triggering conditions for event A3 may be formulated as:

$$N > S + (H_s - CIO_{s,n}) \qquad \text{equation (1)}$$

where:
N is the signal strength of a neighboring cell;
S is the signal strength of a serving cell;
$H_s$ is a hysteresis parameter that the serving cell applies for event A3; and
$CIO_{s,n}$ is a Cell Individual Offset (CIO) set by the serving cell for that specific neighboring cell.

If this condition for event A3 is satisfied and it remains valid for a certain duration known as Time To Trigger (TTT), the UE sends a measurement report to the serving eNB. In FIG. 2, event A3 is satisfied at point A and measurement report is sent at point B in time. When it gets the measurement report, the serving eNB may initiate a handover towards the neighbor eNB. This relates to Actions 106, 108 and 806 to be described below.

As mentioned above, currently the s-measure is used to configure when the UE starts measuring neighbor cells, and the s-measure is defined as an RSRP value. In homogenous networks, this works out quite well because cells are usually deployed in such a way that they have a small shared coverage area around their cell edges. When a UE is very close to the eNB, the RSRP is typically higher than the s-measure, and when the UE moves towards the cell edge, the RSRP decreases, and at some point it falls below the s-measure and the UE starts measuring the RS from neighboring cells. Thus, the UE starts measuring RSRP from other cells, e.g. cells 15, 18 of FIG. 3, only when it is necessary to do so.

Figure 3:
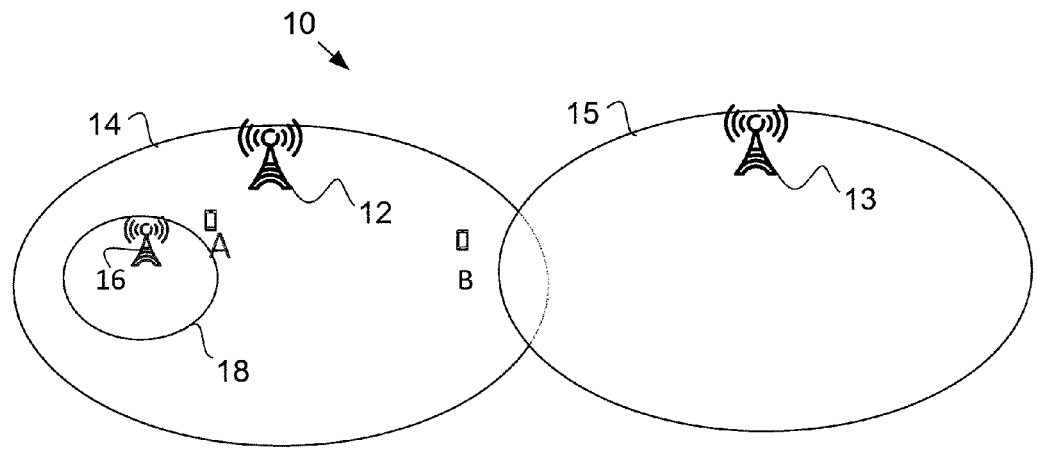
FIG. 3 is a block diagram of the example heterogeneous network of FIG. 1 including a plurality of macro cells.

In heterogeneous networks, on the other hand, the straightforward usage of the s-measure may cause problems. As shown in FIG. 3, a macro cell 14 is supported by an eNB 12, and a neighboring macro cell 15 is supported by an eNB 13. UE "B" is far away from its serving eNB 12 and it calculates a low RSRP, i.e. a RSRP below the s-measure threshold, and will start measuring other cells, while UE "A", which is close to the eNB 12, but also close to a small cell 18 within the coverage area of the serving cell 14, might not start measuring neighbor cells due to the high RSRP it experiences, i.e. a RSRP above the s-measure threshold. This might cause the UE A to experience Radio Link Failure (RLF) even before handover measurements are started.

Embodiments herein will be exemplified in the following non-limiting description.

One solution for resolving the problem with straightforward usage of the s-measure in heterogeneous networks is to use the RSRQ instead of, or along with, the RSRP, as the RSRQ will be low for both UEs A and B due to the fact that the RSRQ takes not only the signal strength of the serving cell, but also the interference from neighboring cells into consideration, see, e.g., the document entitled "Small Cell Discovery in Hetnet" RS-114142 from the 3GPP.

However, using the RSRQ has the following drawbacks (1) traffic variations in the serving cell may cause the RSRQ to vary, e.g. in the ranges of −3 to −11 dB, even without the presence of interfering cells; (2) in some areas the macro cell is much stronger than the small cells and for those areas RSRQ may never be low enough to trigger start of neighbor cell measurements; and (3) for inter-frequency or inter-RAT picocells, RSRQ will not work unless the small cells happen to be in the macro low RSRQ areas, e.g. at cell borders.

Another solution for resolving the problem with straightforward usage of the s-measure in heterogeneous networks comprises enabling the eNBs 12, 13 to configure the s-measure to be used by their UEs 20 based on the number of neighboring small cells 18 in their coverage area. For example, good performance of UE handovers in heterogeneous networks could be achieved if UEs 20 start measuring candidate neighbor cells 18 on time, and then report their measurement reports while they still have a reasonably good connection with their serving cells 14, 15.

Figure 5:
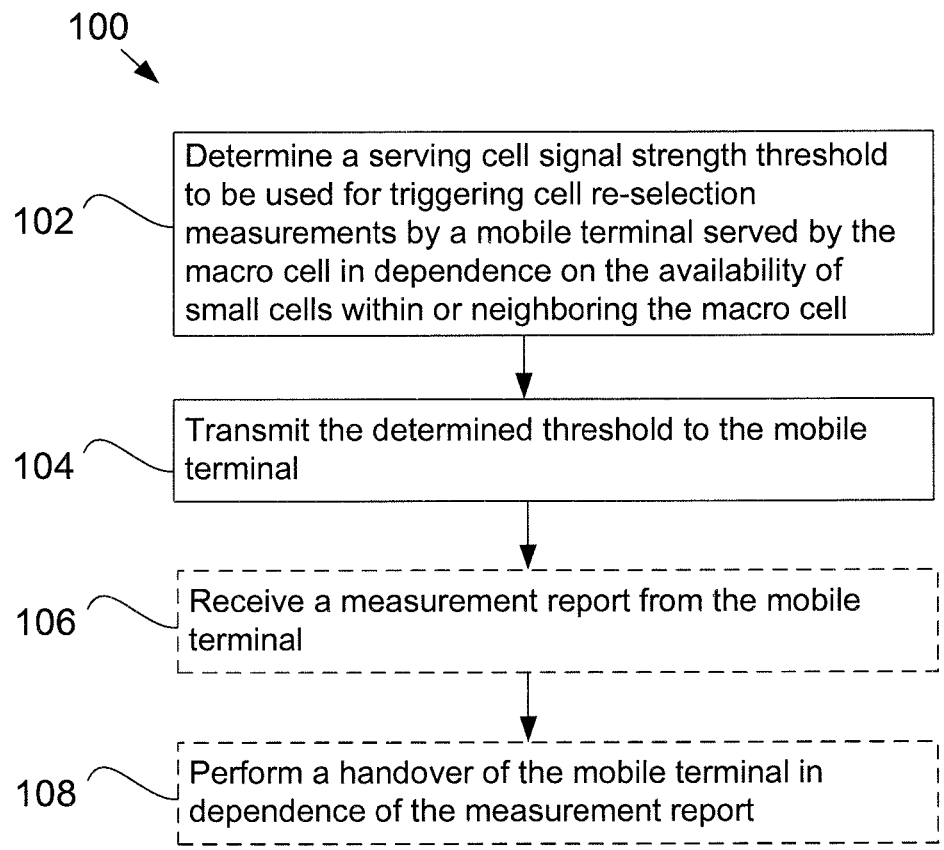
FIGS. 5-6 are logic flow diagrams of example embodiments of a method of adapting a triggering threshold for cell re-selection measurements.
Figure 6:
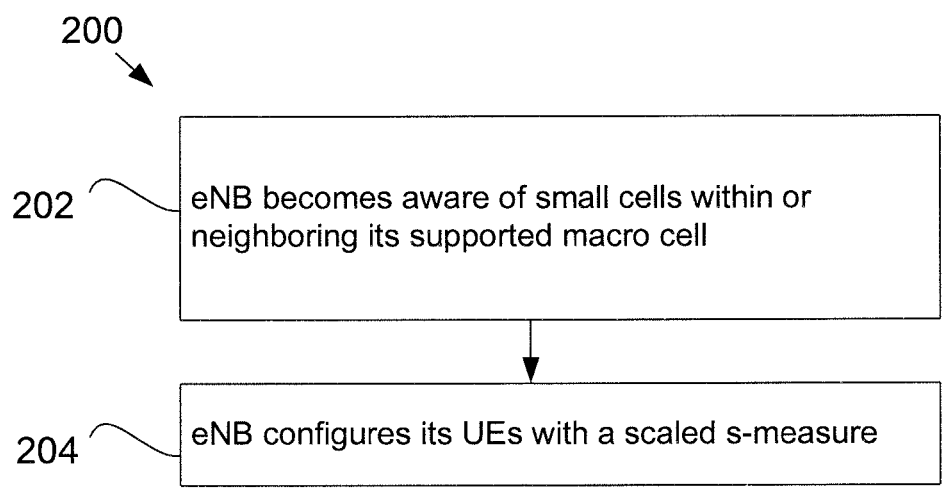

FIGS. 5-6 illustrate example implementations of this latter solution. FIG. 5 illustrates an example method 100 of adapting a triggering threshold for cell re-selection measurements. A serving cell signal strength threshold, e.g. s-measure, to be used for triggering cell re-selection measurements by a mobile terminal 20 served by a macro cell, e.g. cell 14, is determined, in dependence on the availability of small cells, e.g. cells 18a-b, within or neighboring the macro cell (action 102). The determined threshold is then transmitted to the mobile terminal 20 (action 104). The method 100 will be described in more detail below. In that description, the actions 106 and 108 will also be described.

FIG. 6 illustrates another example method 200 of adapting a triggering threshold for cell re-selection measurements. An eNB becomes aware of small cells, e.g. cells 18a-b, within or neighboring its supported macro cell (action 202), and the eNB configures its UEs with a scaled s-measure (action 204). Various embodiments of these methods 100, 200 will now be described in greater detail.

Figure 4:
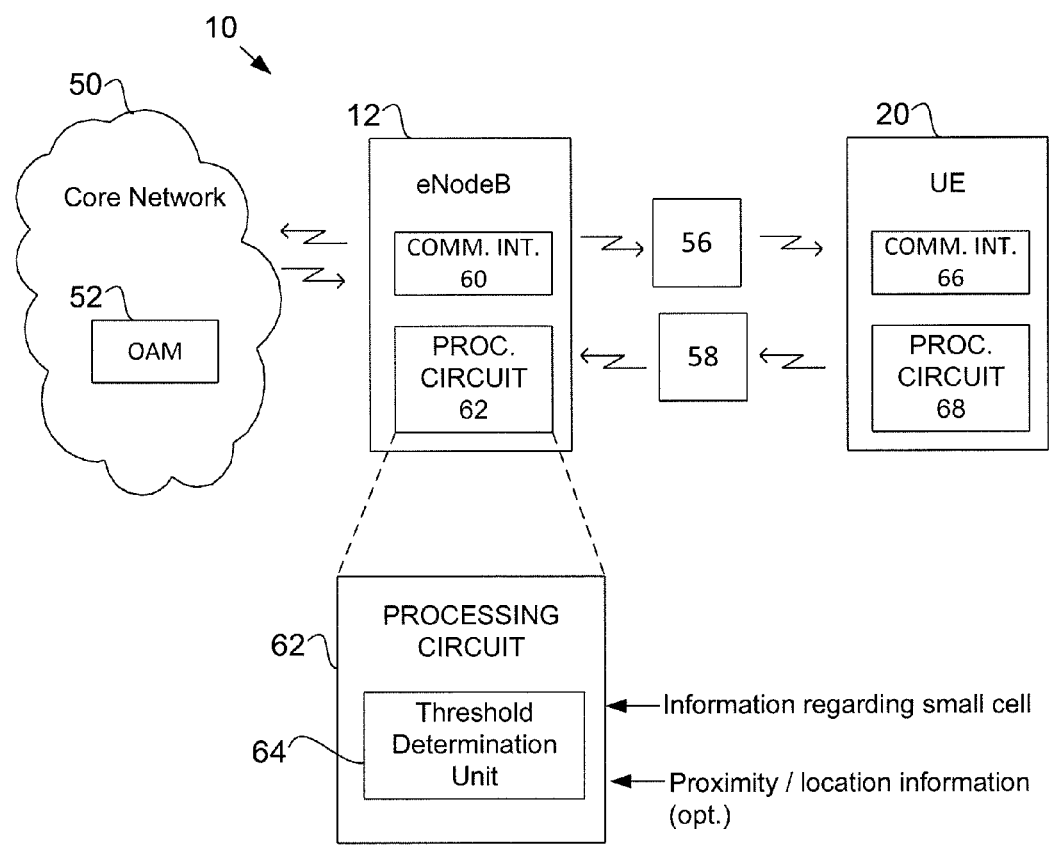
FIG. 4 is a block diagram of components of a heterogeneous network.

FIG. 4 illustrates components of a heterogeneous network 10 operative to implement the methods 100, 200. The network 10 comprises a base station 12, a mobile terminal 20, and a core network 50. The base station 12 is operative to adapt a triggering threshold, e.g. s-measure, for cell re-selection measurements by the mobile terminal 20 in the wireless communication network 10. The base station 12 includes at least one communication interface 60 for communicating with the mobile terminal 20 in the wireless communication network 10, and one or more processing circuits 62 operatively associated with the at least one communication interface 60. The one or more processing circuits 62 include a threshold determination unit 64 configured to determine a serving cell signal strength threshold, e.g. s-measure, to be used for triggering cell re-selection measurements by a mobile terminal 20 served by the macro cell 14, in dependence on the availability of small cells 18 within or neighboring the macro cell 14. The one or more processing circuits are further configured to transmit, via the communication interface 60, the determined threshold to the mobile terminal 20.

Correspondingly, the mobile terminal 20 also comprises a communication interface 66 for communicating with the base station 12, and comprises a processing circuit 68 operatively associated with the communication interface, and configured to receive the s-measure from the base station 12, and to then initiate RSRP measurements of neighboring small cells 18. As a non-limiting example, each of the processing circuits 62, 68 may include one or more microprocessor circuits, digital signal processors (DSPs), or other such digital processing circuitry, and may include fixed (dedicated) hardware circuits, programmable circuits, or a mix of both.

As will be described below in greater detail, the "determining" of action 102 may include the base station 12 receiving an explicit indication from one or more other nodes in or associated with the wireless communication network 10 regarding the presence of small cells 18. Also, the "availability" of small cells 18 of action 102 may refer to small cells 18 that are both active and within or proximate to the macro cell 14. The "availability" of small cells 18 of action 102 may further denote those small cells 18 that are actually active and in or around the current location of the mobile terminal 20.

The "determining" of action 102 may also include the base station 12 being aware of a nominal s-measure value generally set at a level appropriate for the entire macro cell 14, and further include the base station 12 scaling or adjusting that nominal value in dependence on the availability of small cells 18. Thus, mobile terminals 20 in the macro cell 14 with no nearby small cells 18 may still use the nominal s-measure, while mobile terminals 20 with nearby available small cells 18 may receive the adjusted s-measure.

In one example the base station 12 increases the nominal s-measure to make it more likely that its UEs 20 will begin to measure RSRP values of neighboring small cells 18. If, however the quantity of available small cells 18 decreases, perhaps due to the mobile terminals 20 moving to a different part of the macro cell 14 where small cells 18 are not available, the base station 12 will reduce the s-measure for those mobile terminals 20 back to the nominal value.

Thus, in some sense, one or more embodiments described in this application may be understood as advantageously addressing problems that arise when one or more low-power small cells 18 operate within the coverage area of a typically larger, more powerful, macro cell 14.

A plurality of embodiments of the methods described above will now be discussed in greater detail. According to one embodiment, eNBs 12 get summarized information regarding their neighbors from OAM, indicating the percentage of neighbor cells that are small cells. The OAM corresponds to an "Operation and Maintenance" network node 52 within a core network 50 of the wireless communication network 10. Alternatively, eNBs 12 get from OAM 52 the absolute number of low-power nodes in their coverage area. The eNBs 12 then may scale their nominal s-measure according to this information, i.e. the higher the number of the small cells within the macro cell coverage area, the higher the value of s-measure to make their associated mobile terminals more likely to initiate RSRP measurements.

In another embodiment, the eNBs 12 exchange their cell type and cell size. This may be done, for example, when the eNBs 12 perform X2 connections setups, i.e. when the two eNBs establish a connection with each other via an X2 interface. This includes X2 connections between standard macro eNBs 12, and may also include X2 connections between low-power eNBs such as picocells and femtocells. Based on this exchanged information, eNBs may calculate the percentage of their small cell neighbors.

In another embodiment, the eNBs 12 also get the information regarding the distribution of their small cell neighbors, e.g. cells 18a-b, from OAM 52, and differentiate those small cells 18 that are located centrally from small cells that are near cell borders. Using this information, the eNB 12 may scale the s-measure more optimally, because centrally located small cells 18, rather than those located near the cell edges, are more likely to need an adjusted s-measure.

In another embodiment, each eNBs 12 get detailed information from OAM 52 regarding the co-ordinates of all the neighboring small cells 18 relative to their center along with the size of the small cells 18. In the same or another embodiment, the eNBs 12 exchange their cell type, cell size, as well as their co-ordinates. This may be done, for example, when they perform X2 connection setups. The eNBs 12 may then estimate the location of their UEs 20, for example, using Timing Advance (TA) and Angle of Arrival (AoA) measurements on uplink signals, and configure their s-measure appropriately. That is, a UE 20 that is quite close to the serving cell, e.g. macro cell 14, but also close to a small cell neighbor, e.g. cell 18a, might be configured with a higher s-measure than a UE 20 that is a bit farther away from the serving cell but with no small cell in its immediate vicinity.

In one embodiment, the UEs 20 are enabled to determine their locations relative to their serving eNB 12 (for example, based on GPS), and the serving eNB 12 configures the UEs 20 with a table mapping s-measure values to locations within the macro cell 14, which is based on the small cell 18 distribution in the macro serving cell 14. Then, the UEs 20 will pick the appropriate s-measure to use depending on their current location.

In a further embodiment, macro eNBs are aware of the existence of CSG cells via the reception of "proximity indication" and measurement reports from different UEs connected to them. That is, depending on the number of different CSG cells reported by UEs being served by the macro eNB, the macro eNB may adjust the s-measure value.

In a further embodiment, the adaptive s-measure setting is applied to UEs 20 approaching the small cells 18. When a UE 20 sends a proximity indication, current 3GPP standards allows the eNB to send the UE a measurement reconfiguration message known as a an "RRCConnectionReconfiguration" message. This message may, for example, enable the measurement in the frequency used by the small cell, in case of inter-frequency deployment, if the UE was not originally allowed to measure on that frequency for power saving.

In one example, the eNB 12 includes a modified s-measure value in the RRCConnectionReconfiguration message, so that the UEs 20 may start measuring neighboring small cells 18 as soon as possible. In some embodiments, the modified s-measure is comprised in an Information Element (IE) called measConfig, which IE is comprised in the RRCConnectionReconfiguration message. Thus, while UEs 20 far away from the CSG cells use the nominal s-measure, UEs 20 near or approaching the CSG cells will use the adapted value. It should be noted that UEs 20 will send proximity report only when they are near CSG cell to which they have access to. That way, non-member UEs will still be using the nominal s-measure value even when they are in the vicinity of the CSG cell.

It should also be noted that UEs 20 detect their proximity to CSGs generally in one of two ways: (1) using a GPS or other location detection device to compare current position to a previous known position of CSG proximity, or (2) using a signal "fingerprint" of a CSG to determine that an incoming signal is coming from the CSG. This most recently-described embodiment is most applicable to the location-based detection configuration, because under the fingerprint detection configuration the UE would most likely be already measuring the RSRP of the CSG, and thus would be relatively unaffected by a new s-measure.

The number of active small cells 18 within a given macro cell area may vary in time, as the small cells 18 may be user deployed and may be turned on and off much more frequently than the macros. For example, users may turn off their HeNBs 16 when they leave for work or go to bed. In some further embodiments, this possible variation in the number of active small cells 18 within the vicinity of the macro cell 14 is considered on setting the s-measure. For example, HeNBs 16 may send a report of their activity state when they are turned on or off to OAM 52, which may then forward the information to the macro eNBs 12 within the vicinity of the HeNB 16. The OAM 52 may send the activation/deactivation messages one by one, periodically, or when certain thresholds are passed. For example, the OAM 52 may send the activation/deactivation messages when the number of active small cell neighbors falls below or rises above a certain value. Based on the number of active small cell neighbors 18, the macro cell 14 may then scale the s-measure value to be used by its UEs 20 accordingly.

A variety of examples of non-limiting advantages offered by the embodiments described above will now be described. One non-limiting example advantage is that most of the embodiments described above are transparent to the UE 20, and thus older UEs (e.g. 3GPP Release 8 UEs) may benefit from those embodiments.

As another non-limiting example of an advantage offered by the embodiments described above, the UEs 20 are able to perform cell re-selection measurements, e.g. handover measurements, at appropriate times, whether they are located close to the center of their serving cell or near the cell edges, and as such unnecessary outages and/or radio link failures (RLF) may be prevented.

As yet another non-limiting example of an advantage offered by the embodiments described above, the embodiments describe a flexible system that may be realized either via the OAM or through peer to peer communication between neighboring nodes. Thus, the system is viable both for coordinated and uncoordinated deployments, respectively.

As still another non-limiting example of an advantage offered by the embodiments described above, most of the embodiments described above require no standardization changes, and most of the embodiments may be readily realized as proprietary features in products.

Also, although the heterogeneous wireless communication network 10 has been described using LTE terminology (e.g. UE and eNB), it is understood that this is only a non-limiting example, and it is understood that the network 10 may include other non-LTE technology, and the network 10 and methods 100, 200 are not limited to LTE networks.

A method in the base station 12 for adapting a triggering threshold for cell re-selection measurements performed by the mobile terminal 20 served by a macro cell 14 will now be described with reference to FIG. 5.

As previously mentioned, the base station 12 and the mobile terminal 20 are comprised in the wireless communications network 10. Further, as previously mentioned, it should be understood that the expression "cell re-selection" refers to cell change through handover, i.e. cell change when performing handover, and that the expression "cell re-selection measurements" comprises handover measurements.

The method comprises the following actions, which actions do not have to be performed in the order stated below, but may be taken in any suitable order. Further, actions may be combined. Optional actions are indicated by dashed boxes.

Action 102

The base station 12 determines a serving cell signal strength threshold to be used for triggering cell re-selection measurements by the mobile terminal 20. The serving cell signal strength threshold is determined in dependence on the availability of small cells 18a, 18b within or neighboring the macro cell 14.

The serving cell signal strength threshold may be s-measure.

Further, the small cells 18a, 18b may be low-powered base stations such as picocells or femtocells.

Furthermore, small cells 18a, 18b neighboring the macro cell 14 may be understood as small cells 18a, 18b to which the mobile terminal 20 may be handed over to.

In some embodiments, the base station 12 dynamically determines a quantity of available small cells 18a, 18b that are within or neighboring the macro cell 14.

Further, the base station 12 may receive cell information from neighboring cell 15, 18a, 18b. That is, the base station 12 may receive cell information from a neighboring cell 15 and from one or more neighboring small cells 18a, 18b. The cell information may comprise information about the cell size, power level, cell location and/or cell type. For example, cell type may be picocell or femtocell.

In some embodiments, the base station 12 receives an indication regarding the presence of small cells 18a, 18b from one or more core network nodes 52 comprised in or associated with the wireless communications network 10.

Further, the base station 12 may determine the serving cell signal strength threshold in dependence on one or more of: the locations of the small cells 18a, 18b within or neighboring the macro cell 14, the location of the mobile terminal 20 within the macro cell 14 in relation to the locations of the small cells 18a, 18b, and an indication that the mobile terminal 20 is approaching a small cell 18a, 18b within or neighboring the macro cell 14.

Furthermore, when the mobile terminal 20 is in vicinity of a small cell 18a, 18b, the base station 12 may adjust a nominal default threshold to produce the determined threshold, which nominal default threshold is otherwise used throughout by other mobile terminals 20 in the macro cell 14.

Action 104

The base station 12 transmits the determined serving cell signal strength threshold to the mobile terminal 20. Thereby the mobile terminal 20 may be triggered to perform cell re-selection measurements.

In some embodiments, the base station 12 transmits to the mobile terminal 20 a plurality of determined thresholds each mapped to one or more associated positions within the macro cell 14. Thereby, enabling the mobile terminal 20 to select its own threshold based on its position within the macro cell 14. The plurality of determined thresholds may be specific for the mobile terminal 20.

Action 106

The base station 106 may receive a measurement report from the mobile terminal 20. As will be described in action 108, the base station 12 may perform or initiate a handover of the mobile terminal 20 in dependence of the received measurement report.

Action 108

In some embodiments, the base station 12 performs or initiates a handover of the mobile terminal 20 to a neighboring base station 16a, 16b supporting a small cell 18a, 18b neighboring the macro cell 14.

The base station 12 may perform the handover in dependence of the measurement report received in Action 106.

Figure 7:
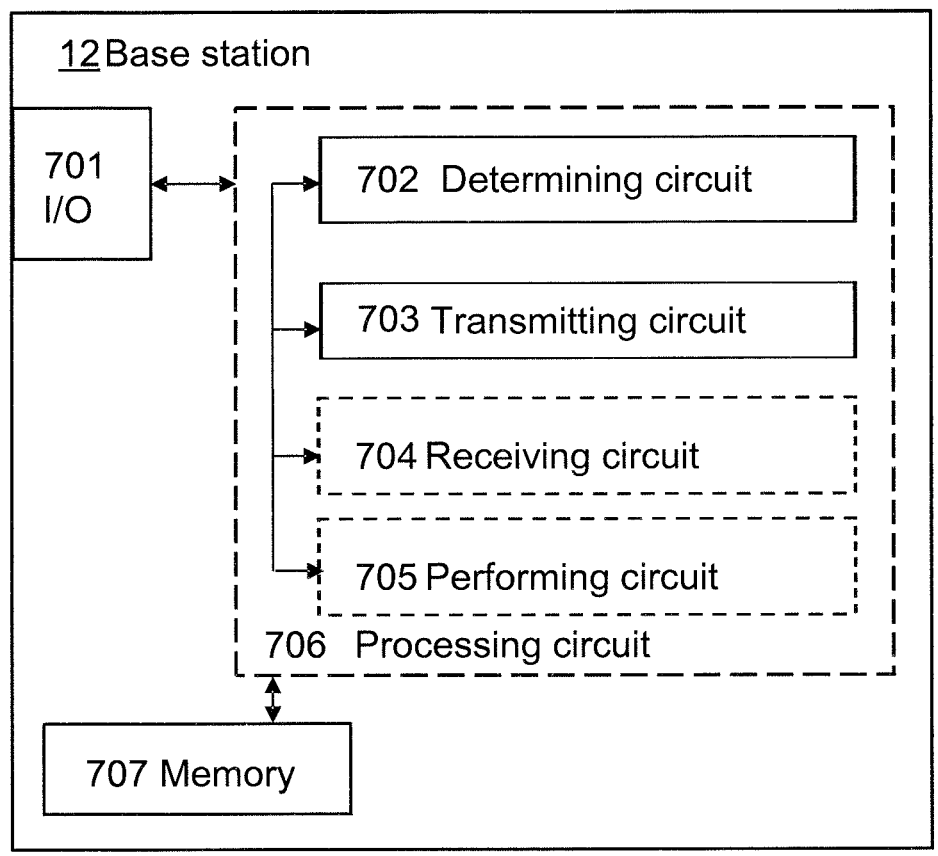
FIG. 7 is a schematic block diagram illustrating embodiments of a base station.

To perform the method actions in the base station 12 described above in relation to FIG. 5, the base station 12 comprises the following arrangement depicted in FIG. 7. As previously mentioned, the base station 12 and the mobile terminal 20 are comprised in the wireless communications network 10.

The base station 12 comprises an input and output port 701 configured to function as an interface for communication in the communication network 10. The communication may for example be communication with the mobile terminal 20.

The input and output port 701 corresponds to the communications interface 60 shown in FIG. 4.

Further, the base station 12 comprises a determining circuit 702 configured to determine a serving cell signal strength threshold to be used for triggering cell re-selection measurements by the mobile terminal 20. The determining circuit 702 is configured to determine the serving cell signal strength threshold in dependence on the availability of small cells 18a, 18b within or neighboring the macro cell 14.

The serving cell signal strength threshold may be s-measure.

Further, the small cells 18a, 18b may be low-powered base stations such as picocells or femtocells.

Furthermore, small cells 18a, 18b neighboring the macro cell 14 should be understood to be small cells 18a, 18b to which the mobile terminal 20 may be handed over to.

The determining circuit 702 may further be configured to dynamically determine a quantity of available small cells 18a, 18b that are within or neighboring the macro cell 14.

In some embodiments, the determining circuit 702 is further configured to receive cell information from neighboring cell 15, 18a, 18b. That is, the determining circuit 702 is further configured to receive cell information from a neighboring cell 15 and from one or more neighboring small cells 18a, 18b. The cell information may comprise information about the cell size, power level, cell location and/or cell type. For example, the cell type may be picocell or femtocell.

Further, the determining circuit 702 may be configured to receive an indication regarding the presence of small cells 18a, 18b from one or more core network nodes, e.g. OAM 52, comprised in or associated with the wireless communications network 10.

Furthermore, the determining circuit 702 may be configured to determine the serving cell signal strength threshold in dependence of one or more of: the locations of the small cells 18a, 18b within or neighboring the macro cell 14, the location of the mobile terminal 20 within the macro cell 14 in relation to the locations of the small cells 18a, 18b, and an indication that the mobile terminal 20 is approaching a small cell 18a, 18b within or neighboring the macro cell 14.

In some embodiments, the determining circuit 702 is further configured to, when the mobile terminal 20 is in vicinity of a small cell 18a, 18b, adjust a nominal default threshold to produce the determined threshold. The nominal default threshold is otherwise used throughout by other mobile terminals 20 in the macro cell 14.

The determining circuit 702 corresponds to the threshold determination unit 64 shown in FIG. 4.

Furthermore, the base station 12 comprises a transmitting circuit 703 configured to transmit the determined serving cell signal strength threshold to the mobile terminal 20. The transmitting circuit 703 may further be configured to transmit to the mobile terminal 20 a plurality of determined thresholds each mapped to one or more associated positions within the macro cell 14. Thereby, the transmitting circuit 702 enables the mobile terminal 20 to select its own threshold based on its position within the macro cell 14. The plurality of determined thresholds may be specific for each mobile terminal 20.

In some embodiments, the base station 12 further comprises a receiving circuit 704 configured to receive a measurement report from the mobile terminal 20.

A performing circuit 705 may be comprised in the base station 12. The performing 705 is configured to perform or initiate a handover of the mobile terminal 20 to a neighboring base station 16a, 16b supporting a small cell 18a, 18b neighboring the macro cell 14. In some embodiments, the performing circuit 705 is configured to perform or initiate the handover of the mobile terminal 20 independence of the received measurement report, Embodiments herein for adapting a triggering threshold for cell re-selection measurements performed by the mobile terminal 20 served by a macro cell 14 may be implemented through one or more processors, such as a processing circuit 706 in the base station 12 depicted in FIG. 7, together with computer program code for performing the functions and/or method actions of embodiments herein.

For example, one or more of the determining circuit 702, the transmitting circuit 703, the receiving circuit 704, and the performing circuit 705 described above may be implemented by the processing circuit 706.

Further, it should be understood that one or more of the circuits comprised in the base station 12 described above may be integrated with each other to form an integrated circuit.

The processing circuit 706 corresponds to the processing circuit 62 shown in FIG. 4.

The base station 12 may further comprise a memory 707. The memory 707 may comprise one or more memory units and may be used to store for example data such as thresholds, predefined or pre-set information, etc.

Figure 8:
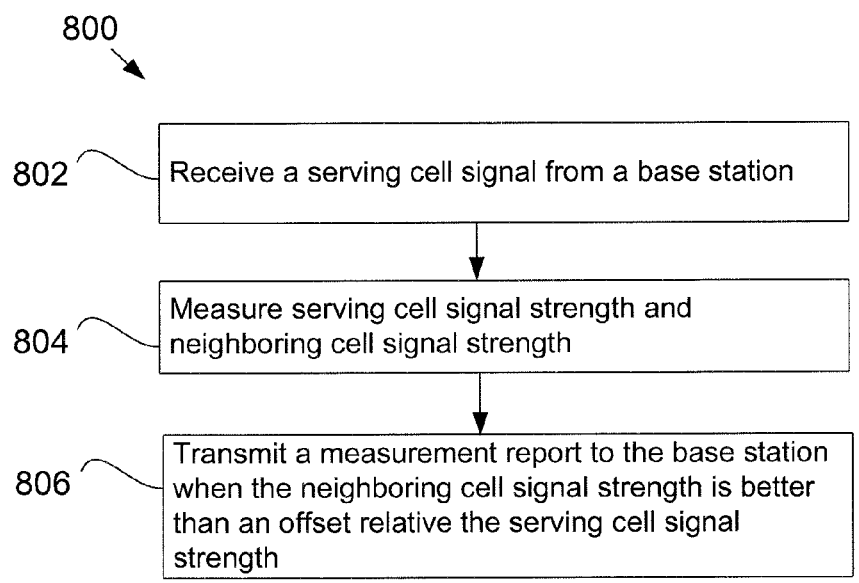
FIG. 8 is a flowchart depicting embodiments of a method in a mobile terminal.

A method in the mobile terminal 20 for performing cell re-selection measurements in dependence of a triggering threshold will now be described with reference to FIG. 8.

As previously mentioned, the mobile terminal 20 is served by the macro cell 14. Further, the macro cell 14 is supported by a base station 12, and the base station 12 and the mobile terminal 20 are comprised in the wireless communications network 10. Furthermore, as previously mentioned, it should be understood that the expression "cell re-selection" refers to cell change through handover, i.e. cell change when performing handover, and that the expression "cell re-selection measurements" comprises handover measurements.

The method comprises the following actions, which actions do not have to be performed in the order stated below, but may be taken in any suitable order. Further, actions may be combined. Optional actions are indicated by dashed boxes.

Action 801

The mobile terminal 20 receives a serving cell signal strength threshold from the base station 12. As will described in relation to Action 802, the serving cell signal strength threshold may trigger the mobile terminal 20 to measure cell signal strengths of the serving cell and neighboring cells.

The serving cell signal strength threshold may be s-measure.

Action 802

The mobile terminal 20 measures serving cell signal strength and neighboring cell signal strength in dependence of the received serving cell signal strength threshold.

In some embodiments, the mobile terminal 20 receives from the base station 12 a plurality of thresholds each mapped to one or more associated positions within the macro cell 14, and selects one threshold of the plurality of thresholds based on its position within the macro cell 14, i.e. based on the mobile terminal's position within the macro cell 14.

The plurality of thresholds may be specific for each mobile terminal 20.

Action 803

The mobile terminal 20 transmits a measurement report to the base station 12 when the neighboring cell signal strength is better than an offset relative the serving cell signal strength.

As described in relation to Actions 106 and 108, the measurement report may trigger the base station 12 to perform or initiate a handover of the mobile terminal 20.

Figure 9:
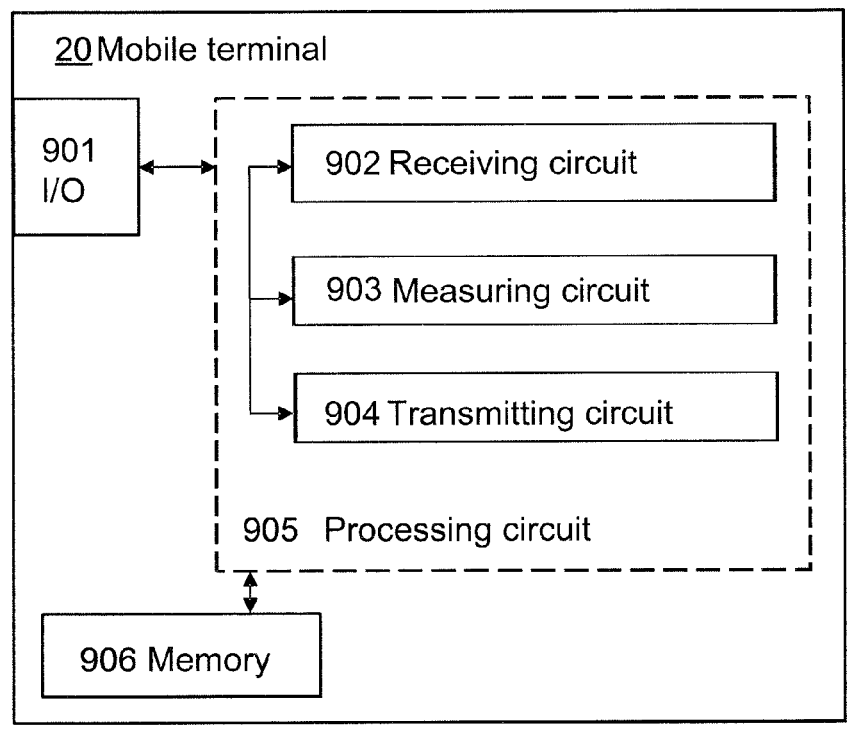
FIG. 9 is a schematic block diagram illustrating embodiments of a mobile terminal.

To perform the method actions in the mobile terminal 20 described above in relation to FIG. 8, the mobile terminal 20 comprises the following arrangement depicted in FIG. 9.

As previously mentioned, the mobile terminal 20 is served by the macro cell 14. Further, the macro cell 14 is supported by a base station 12, and the base station 12 and the mobile terminal 20 are comprised in the wireless communications network 10.

The mobile terminal 20 comprises an input and output port 901 configured to function as an interface for communication in the communication network 10. The communication may for example be communication with the base station 12.

The input and output port 901 corresponds to the communications interface 66 shown in FIG. 4.

Further, the mobile terminal 20 comprises a receiving circuit 902 configured to receive a serving cell signal strength threshold from the base station 12. As previously described, the serving cell signal strength threshold may trigger the mobile terminal 20 to measure cell signal strengths of the serving cell and neighboring cells.

In some embodiments, the receiving circuit 902 is further configured to receive from the base station 12 a plurality of thresholds each mapped to one or more associated positions within the macro cell 14, and to select one threshold of the plurality of thresholds based on its position within the macro cell 14.

The plurality of thresholds may be specific for each mobile terminal 20.

Furthermore, the mobile terminal 20 comprises a measuring circuit 903 configured to measure serving cell signal strength and neighboring cell signal strength in dependence of the received serving cell signal strength threshold.

A transmitting circuit 904 is further comprised in the mobile terminal 20. The transmitting circuit 904 is configured to transmit a measurement report to the base station 12. The transmitting circuit 904 may transmit the measurement report when a neighboring cell signal strength is better than an offset relative the serving cell signal strength.

As described in relation to Actions 106 and 108, the measurement report may trigger the base station 12 to perform or initiate a handover of the mobile terminal 20.

Embodiments herein for performing cell re-selection measurements in dependence of a triggering threshold may be implemented through one or more processors, such as a processing circuit 905 comprised in the mobile terminal 20 depicted in FIG. 9, together with computer program code for performing the functions and/or method actions of embodiments herein.

For example, one or more of the receiving circuit 902, the measuring circuit 903, and the transmitting circuit 904 described above may be implemented by the processing circuit 905.

Further, it should be understood that one or more of the circuits comprised in the mobile terminal 20 described above may be integrated with each other to form an integrated circuit.

The processing circuit 905 corresponds to the processing circuit 68 shown in FIG. 4.

The mobile terminal 20 may further comprise a memory 906. The memory 906 may comprise one or more memory units and may be used to store for example data such as thresholds, predefined or pre-set information, etc.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method, in a base station, for adapting a triggering threshold for cell re-selection measurements performed by a mobile terminal served by a macro cell, wherein the macro cell is supported by the base station, and wherein the base station and the mobile terminal are comprised in a wireless communications network, the method comprising:
   determining a serving cell signal strength threshold, to be used for triggering cell re-selection measurements by the mobile terminal, based on availability of small cells within or neighboring the macro cell, wherein the serving cell signal strength threshold increases based on an increase in the availability of small cells; and
   transmitting the determined serving cell signal strength threshold to the mobile terminal.

2. The method of claim 1, wherein the determining the serving cell signal strength threshold further comprises dynamically determining a quantity of available small cells that are within or neighboring the macro cell.

3. The method of claim 1, wherein determining the serving cell signal strength threshold further comprises receiving cell information from a neighboring cell, the cell information comprising information about at least one of:
   cell size;
   power level;
   cell location;
   cell type.

4. The method of claim 1, wherein the determining the serving cell signal strength threshold further comprises receiving an indication regarding the presence of small cells from one or more core network nodes comprised in or associated with the wireless communications network.

5. The method of claim 1, wherein the determining the serving cell signal strength threshold is dependent on one or more of:
   locations of the small cells within or neighboring the macro cell;
   a location of the mobile terminal within the macro cell in relation to the locations of the small cells;
   an indication that the mobile terminal is approaching a small cell within or neighboring the macro cell.

6. The method of claim 1, wherein the determining the serving cell signal strength threshold further comprises, when the mobile terminal is in vicinity of a small cell, adjusting a nominal default threshold to produce the determined threshold, the nominal default threshold otherwise used by other mobile terminals in the macro cell.

7. The method of claim 1, wherein the transmitting the determined threshold to the mobile terminal comprises transmitting, to the mobile terminal, a plurality of determined thresholds, each threshold mapped to one or more associated positions within the macro cell, to enable the mobile terminal to select its own threshold based on its position within the macro cell.

8. The method of claim 1, wherein the small cells are picocells or femtocells.

9. The method of claim 1, wherein small cells neighboring the macro cell are small cells to which the mobile terminal may be handed over to.

10. The method of claim 1, wherein the serving cell signal strength threshold is an s-measure.

11. The method of claim 1, further comprising:
receiving a measurement report from the mobile terminal;
based on the measurement report, performing a handover of the mobile terminal to a neighboring base station supporting a small cell neighboring the macro cell.

12. A base station configured to adapt a triggering threshold for cell re-selection measurements performed by a mobile terminal served by a macro cell, wherein the macro cell is supported by the base station, and wherein the base station and the mobile terminal are comprised in a wireless communications network, the base station comprising:
a determining circuit configured to determine a serving cell signal strength threshold, to be used for triggering cell re-selection measurements by the mobile terminal based on availability of small cells within or neighboring the macro cell, wherein the serving cell signal strength threshold increases based on an increase in the availability of small cells; and
a transmitting circuit configured to transmit the determined serving cell signal strength threshold to the mobile terminal.

13. The base station of claim 12, wherein the determining circuit further is configured to dynamically determine a quantity of available small cells that are within or neighboring the macro cell.

14. The base station of claim 12, wherein the determining circuit further is configured to receive cell information from neighboring cell, the cell information comprising information about one or more of:
cell size;
power level;
cell location;
cell type.

15. The base station of claim 12, wherein the determining circuit further is configured to receive an indication regarding the presence of small cells from one or more core network nodes comprised in or associated with the wireless communications network.

16. The base station of claim 12, wherein the determining circuit further is configured to determine the serving cell signal strength threshold based on one or more of:
locations of the small cells within or neighboring the macro cell;
a location of the mobile terminal within the macro cell in relation to the locations of the small cells;
an indication that the mobile terminal is approaching a small cell within or neighboring the macro cell.

17. The base station of claim 12, wherein the determining circuit further is configured to, when the mobile terminal is in vicinity of a small cell, adjust a nominal default threshold to produce the determined threshold, the nominal default threshold otherwise used by other mobile terminals in the macro cell.

18. The base station of claim 12, wherein the transmitting circuit further is configured to transmit, to the mobile terminal, a plurality of determined thresholds, each threshold mapped to one or more associated positions within the macro cell, to enable the mobile terminal to select its own threshold based on its position within the macro cell.

19. The base station of claim 12, wherein the small cells are picocells or femtocells.

20. The base station of claim 12, wherein small cells neighboring the macro cell are small cells to which the mobile terminal may be handed over to.

21. The base station of claim 12, wherein the serving cell signal strength threshold is an s-measure.

22. The base station of claim 12, further comprising:
a receiving circuit configured to receive a measurement report from the mobile terminal;
a performing circuit configured to, based on the measurement report, perform a handover of the mobile terminal to a neighboring base station supporting a small cell neighboring the macro cell.

23. A method, in a mobile terminal, for performing cell re-selection measurements based on a triggering threshold, wherein the mobile terminal is served by a macro cell, wherein the macro cell is supported by a base station, and wherein the base station and the mobile terminal are comprised in a wireless communications network, the method comprising:
receiving a serving cell signal strength threshold from the base station;
measuring serving cell signal strength and neighboring cell signal strength based on the received serving cell signal strength threshold;
transmitting a measurement report to the base station in response to the neighboring cell signal strength being better than an offset relative the serving cell signal strength;
wherein the receiving the threshold from the base station comprises:
receiving, from the base station, a plurality of thresholds, each threshold mapped to one or more associated positions within the macro cell;
selecting one threshold of the plurality of thresholds based on the mobile terminal's position within the macro cell.

24. The method of claim 23, wherein the serving cell signal strength threshold is an s-measure.

25. A mobile terminal configured to perform cell re-selection measurements based on a triggering threshold, wherein the mobile terminal is served by a macro cell, wherein the macro cell is supported by a base station, and wherein the base station and the mobile terminal are comprised in a wireless communications network, the mobile terminal comprising:
a receiving circuit configured to receive a serving cell signal strength threshold from the base station;
a measuring circuit configured to measure serving cell signal strength and neighboring cell signal strength based on the received serving cell signal strength threshold;
a transmitting circuit configured to transmit a measurement report to the base station when a neighboring cell signal strength is better than an offset relative the serving cell signal strength;
wherein the receiving circuit further is configured to:
receive, from the base station, a plurality of thresholds, each threshold mapped to one or more associated positions within the macro cell;

select one threshold of the plurality of thresholds based on the mobile terminal's position within the macro cell.

26. The mobile terminal of claim 25, wherein the serving cell signal strength threshold is an s-measure.

* * * * *